United States Patent Office 3,251,793
Patented May 17, 1966

3,251,793
COATING COMPOSITIONS COMPRISING ETHYL-ENICALLY UNSATURATED COMPOUNDS AND PINE WOOD RESIN
Henry A. Vogel, Gibsonia, Pa., assignor to Pittsburgh Plate Glass Company, Pittsburgh, Pa., a corporation of Pennsylvania
No Drawing. Filed Mar. 20, 1963, Ser. No. 266,510
10 Claims. (Cl. 260—27)

This application is a continuation-in-part of copending application Serial No. 51,819, filed August 25, 1960, now U.S. Patent No. 3,117,963.

This invention relates to new coating compositions. More particularly, the invention relates to coating compositions suitable for the interior of metallic beverage containers.

It has long been known that certain vinyl resins are particularly good for coating the inside of metal containers, especially hermetically sealed containers which are to be used for beverages, such as beer, carbonated drinks and juices, because of their excellent freedom from imparting taste to the contents. The vinyl halide polymers and copolymers of vinyl halides with vinyl acetate are among the most suitable for this use. However, they have only poor adhesion to metal substrates, such as tin-plated steel and aluminum. These vinyl resins are also usually sprayed onto the inside of the container after fabrication in order to obtain a continuous stress-free coating which is not likely to craze.

In order to overcome the above-mentioned lack of adhesion of vinyl resins and provide a good substrate for spraying, it has become necessary to use a base coat or primer with these vinyl resins. In addition to having good adhesion to tin plate, aluminum or other metal substrates, base coats must also have good flexibility in order to withstand fabrication techniques involved in making the containers, must have low extractability, must have good taste properties in the event the sprayed vinyl top coat is imperfect or marred so that the base coat is exposed, and must also have good scorch resistance during soldering of the can seam.

In copending application Serial No. 51,819, filed August 25, 1960, and now U.S. Patent 3,117,693, it is disclosed that excellent container coatings which have the above-mentioned properties can be obtained through the use, as a base coat, of a heat hardenable, resinous composition comprising an aldehyde-modified interpolymer of a polymerizable unsaturated carboxylic acid amide with at least one monomer having a $CH_2=C<$ group, which interpolymer is reacted with an aldehyde, preferably in the presence of an alcohol. While these interpolymers may be used themselves, it is preferred that a modifying resin be used themselves, it is preferred that a modifying resin be blended therewith. A particularly useful class of modifying resins is the epoxy resins, although many other resins may also be employed.

The invention described in said copending application is carried out by applying the heat hardenable, resinous composition by roll coating, spraying or the like directly to tin-plated steel or to the finished can, and subsequently applying a vinyl resin to the surface of the coating of the resinous composition containing the aforementioned carboxylic acid amide interpolymer resin. Preferably, the base coat is substantially completely cured before the top coat (or coats) is applied; the container is then ready to be filled and sealed.

The present invention relates to compositions in which the aldehyde-modified carboxylic acid amide interpolymer is blended with a substance which imparts color to the otherwise clear interpolymer. These compositions, when applied to containers or to other surfaces, permit the coating thickness to be easily observed and controlled. In addition, they tend to improve the adhesion of the film to metal surfaces under food processing conditions, are not toxic, and do not exude from the film surface.

In addition to their usefulness as base coats under vinyl resins or other types of resins, the compositions of this invention have properties which permit their utilization as the sole coating or as the top coat over a conventional base coat; for example, over a polybutadiene or an oleoresinous varnish base coat. Thus, these compositions have good adhesion to metal and to the various materials used as base coats, including polybutadiene resins, epoxy resins, oleoresinous varnish and thermosetting acrylic resins; they are substantially tasteless; and they have excellent resistance to high temperatures, since they can be subjected to temperatures as high as 212° F. or higher without blushing.

The compositions of this invention comprise a blend of monoaldehyde-substituted amide interpolymer, and 2 to 40 percent by weight of ester gum or substantially petroleum hydrocarbon-insoluble pine wood resin. Various phenolic and glycerol ester gums can be employed. While the exact composition of ester gum is not known, a typical glycerol ester gum has an acid number of about 8, a softening point (Hercules Drop Method) of about 89 to 96° C., a specific gravity (25° C.) of 1.079, and a Gardner-Holdt viscosity (60 percent solids in mineral spirits) of A to C. Because of its more pronounced color, the preferred ester gum is the glycerol ester of the substantially petroleum hydrocarbon-insoluble pine wood resin described below, which contains phenolic constituents and is known commercially as "Vinsol Ester Gum." This material is a hard, dark colored, thermoplastic resin having an acid number of about 20 and a softening point (Hercules Drop Method) of 140 to 155° C.

The substantially petroleum hydrocarbon-insoluble pine wood resin which may be employed in the compositions described herein is known commercially as "Vinsol" and is described in U.S. Patent 2,724,705. This resinous material may be prepared from pine wood as follows: The pine wood, which may or may not have been steamed to remove volatile constituents such as turpentine and pine oil, is extracted with a coal tar hydrocarbon such as benzol or toluol, and the extract then freed of volatile constituents. The residue consists of a mixture of wood rosin and the resin used in the present composition. Extraction of this mixture with a petroleum hydrocarbon such as, for example, gasoline, dissolves and removes the rosin. After separation of the rosin, high in abietic acid, a resinous residue remains which is low in abietic acid. Alternatively, the material obtained on evaporation of the coal tar hydrocarbon extract may be dissolved in a mixture of furfural and a petroleum hydrocarbon such as gasoline, and the two layers which form separated, in which case the substantially petroleum hydrocarbon-insoluble resin is found dissolved in the furfural phase from which it may be obtained by evaporation of the furfural. Other methods of isolating the desired petroleum hydrocarbon-insoluble pine wood resin may be employed, if desired. This resin, used in accordance with the present invention, is characterized by a dark red brown color, cherry red in solution, and by substantial insolubility in petroleum hydrocarbons. It will vary somewhat in its specific characteristics, such as acid number, melting point, exact petroleum ether solubility, and content of naphtha and toluol-insoluble material, depending upon the details of the extraction processes utilized. This resin will meet or nearly meet the following specifications, namely, substantialy insolubility in petroleum hydrocarbons, substantially complete solubility in aromatic hydrocarbons and in alcohol, a methoxy content of about 3 percent to about 7.5 percent (usually from about 4 percent to about 6 percent), an acid number in the range from about 90 to about 110, and a drop melting point in the range from about 95° C. to about 125° C. This resin is a solid material and comes into commerce in the pulverized or ground form.

The amide interpolymer component of the compositions of this invention can be any aldehyde-modified interpolymer of an unsaturated carboxylic acid amide; the aldehyde-modified interpolymer is preferably at least partially etherified. Aldehyde-modified amide polymers are obtained by polymerizing an unsaturated amide and at least one ethylenically unsaturated monomer and reacting the initial product of the polymerization with an aldehyde. Etherification is carried out by further reaction of the aldehyde-modified interpolymer with an alcohol. Alternatively, aldehyde-modified interpolymers are produced by interpolymerizing an aldehyde-modified amide, such as an alkylol amide, which may be then etherified, or by employing an N-alkoxyalkyl amide.

In either case, the aldehyde-modified etherified amide polymer contains amide groups having a hydrogen atom replaced by the structure

where R is hydrogen or an alkyl radical and $R_1$ is hydrogen or an organic radical.

Methods for producing N-alkoxyalkyl substituted unsaturated carboxylic acid amides such as N-butoxymethylacrylamide, which amides are quite useful to produce the amide polymers employed herein, are disclosed in copending applications Serial No. 775,380, now U.S. Patent 3,079,434, and Serial No. 73,177, filed December 2, 1960, now U.S. Patent 3,087,965. When these and similarly substituted unsaturated carboxylic acid amides are polymerized, the resulting reaction product contains the aforesaid structure without any further treatment. If, however, the unsaturated carboxylic acid amide does not contain such a structure, i.e., an unsubstituted amide is employed, the resulting amide polymer must be reacted with an aldehyde whereby such structures in which $R_1$ is hydrogen are produced by reaction of the aldehyde with an amido hydrogen atom to produce a hydroxyorgano group. If, as is preferred, the aldehyde-modified product is further reacted with an alcohol, etherification of the hydroxyorgano groups by the alcohol takes place.

After etherification, the amide polymer contains amide groups having a hydrogen atom replaced by the structure

where R is hydrogen when the aldehyde employed is formaldehyde and an alkyl radical when other aliphatic aldehydes are used. $R_1$ is the radical derived by removing a hydroxyl group from the etherifying alcohol, i.e., an organic radical. The radical $R_1$ in those groups not etherified represents hydrogen. $R_1$ in the etherified groups can be alkyl or aryl. The terms alkyl and aryl, as employed herein, are to be construed broadly; the groups represented by $R_1$ may include other substituents and functional groups which do not affect the properties of the product. Thus, $R_1$ may include unsaturated linkages, ether linkages, halogens, and other substituents, or it may be cyclic.

Satisfactory products may in some instances be obtained with none or only a very small part of the hydroxyorgano groups having been etherified, in some instances 5 percent or less. However, it is usually desirable that at least about 50 percent of the hydroxyorgano groups be etherified, since many compositions having less than about 50 percent of the groups etherified have a tendency to be somewhat less stable and may be subject to gelation.

Butanol is a preferred alcohol for use in the etherification, although any monohydric alcohol such as methanol, ethanol, propanol, pentanol, octanol, decanol and other alkanols containing up to about 20 carbon atoms or more may also be employed, as may aromatic alcohols, such as benzyl alcohol; or cyclic alcohols, such as cyclohexanol; or substituted alcohols, such as 3-chloropropanol; or the monoethers of glycols, such as the Cellosolves and Carbitols.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and ethers thereof, and imide derivatives, such as N-carbamyl maleimide, may also be utilized.

At least one other unsaturated monomer is interpolymerized with the unsaturated carboxylic acid amide; any polymerizable ethylenically unsaturated monomer can be so utilized. Such monomers include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. The interpolymer compositions described in U.S. Patent 3,037,963 are excellent examples of the preferred type of amide polymers utilized in the instant invention, and the compounds disclosed therein illustrate the numerous monomers which can be interpolymerized along with the amide.

Preferably, the amide polymer should contain from about 2 percent to about 50 percent by weight of the unsaturated carboxylic acid amide component, the balance being the other ethylenically unsaturated monomer(s).

In carrying out the polymerization reaction a peroxygen type catalyst is ordinarily utilized. Useful catalysts for this purpose include acetal benzoyl peroxide, cyclohexanone peroxide, cyclohexyl hydroperoxide, cumene hydroperoxide, acetyl peroxide, lauroyl peroxide, benzoyl peroxide, methyl cyclohexyl hydroperoxide, di-t-butyl peroxide, peracetic acid, t-butyl permaleic acid, di-t-butyl diperphthalate, and the like. Azo compounds, such as p-methoxyphenyl diazothio-(2-naphthyl) ether and alpha, alpha'-azobisisobutyronitrile, may also be used, as may redox catalyst systems. The quantity of catalyst employed can be varied considerably; however, in most instances it is desirable to utilize from about 0.1 to 2.0 percent.

In many instances, it is also desirable to add a chain modifying or "short-stopping" agent to the polymerization mixture. Mercaptans are conventionally used for this purpose, but other chain modifying agents such as cyclopentadiene, allyl carbamate, alpha-methyl styrene, and the like can also be used to secure low molecular weights, as can unsaturated fatty acids or esters.

The polymerization to produce the amide polymer is best carried out by admixing the amide, any other monomer or monomers, the catalyst and chain modifying agent, if any, in the solvent, and refluxing the resulting solution for a time sufficient to obtain the desired conversion. Ordinarily, the polymerization will be complete in about 1 to 16 hours. It is often desirable to add the catalyst in increments as the polymerization progresses, and good agitation and careful temperature control are also desirable because of the very rapid reaction rate and because the reaction is highly exothermic.

When necessary to produce the desired structures the carboxylic acid amide is reacted with an aldehyde, preferably in the presence of an alcohol. Formaldehyde, in solution in water (formalin) or in an alkanol such as butanol, or a formaldehyde-yielding substance such as paraformaldehyde, trioxymethylene, or hexamethylenetetramine, is greatly preferred. However, other aldehydes including acetaldehyde, butyraldehyde, furfural, and the like, preferably containing only atoms of carbon, hydrogen and oxygen, can be used. It is ordinarily preferred to utilize about two equivalents of aldehyde for each amide group present in the interpolymer, although this ratio may be raised or lowered considerably if desired. For example, the ratio may be as high as 3.0 equivalents or as low as about 0.2 equivalent of aldehyde for each amide group in the interpolymer.

The reaction is preferably carried out by refluxing the aldehyde and the polymer in the presence of a mild acid catalyst, such as maleic anhydride. Other acid catalysts, such as oxalic acid, hydrochloric acid, or sulfuric acid, may also be employed, although there is some possibility of gelation occurring if the acid catalyst is too strongly acidic. The quantity of catalyst utilized may be varied widely; the more acidic the reaction medium, the greater amount of etherification will occur.

As noted above, similar polymeric materials may also be obtained by polymerizing a modified amide, such as an alkylolamide or an N-alkoxyalkyl amide. The polymerization utilizing an alkylolamide or an N-alkoxyalkyl-amide is carried out in substantially the same manner as when the unmodified amide is interpolymerized.

It has been found that increasing the molecular weight of the aldehyde-modified carboxylic acid amide interpolymer improves the toughness and therefore makes for better roll coating compositions. By adjusting the proportions of the different monomer constituents in the preparation of the interpolymer itself, the coating properties, such as flexibility, toughness and chemical resistance may be varied. In order to prepare coatings having sufficient flexibility and toughness to withstand subsequent fabrication procedures, such as those involved in the preparation of a "tin can," a ternary interpolymer containing both a monomer which imparts hardness and a monomer which imparts flexibility should be employed. It is advantageous that the monomer which imparts hardness constitute less than 40 percent by weight of the interpolymer, but at least 10 percent and preferably between 20 and 30 percent by weight. Examples of the former are styrene, substituted styrenes and methyl methacrylate, while ethyl acrylate is an example of the latter.

Particularly useful compositions for blending with the ester gum or pine wood resin include an epoxy resin along with the aldehyde-modified interpolymer, examples of such blends being disclosed in U.S. Patent No. 2,870,117. Epoxy compounds not containing a polyglycidyl ether structure can be employed, for instance, the epoxidized polydiolefins and epoxidized aromatic compounds are excellent modifying agents.

Preferred epoxy resins are polyglycidyl ethers of polyhydric compounds, and preferably polyglycidyl ethers of dihydric phenols having as their sole functional groups epoxy and hydroxy groups. A representative epoxide resin structure may be illustrated as follows:

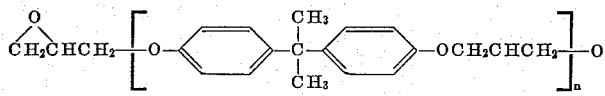 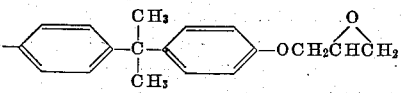

In the foregoing structure, $n$ is a number of a magnitude dependent upon the degree to which the etherification is carried. The epoxy resins are frequently characterized by molecular weight, and it has been found that those epoxy resins possessing a molecular weight above about 200 and preferably about 700 to 2000 are most suitable for combining with interpolymers of unsaturated carboxylic amides. However, epoxy resins having other molecular weights may also be utilized.

When an epoxy resin is blended with the amide interpolymers, amounts as low as about 5 percent by weight of the epoxy resin can be utilized, as can amounts as high as 40 percent or more of the epoxy resin. Preferably, the epoxy resin is utilized in an amount of about 10 percent to about 20 percent.

Preferably, the coating compositions of this invention are to be applied to tin plate. However, they are also useful as inner linings for black iron plate containers, particularly containers for frozen fruit juices. The coating compositions of this invention can also be applied to other metal containers or to metal surfaces in general; they are particularly adaptable for coating the inside of aluminum containers. Regardless of the type of metal employed, the films are baked for about 10 minutes at a temperature in range of about 290° F. to 425° F. to obtain a satisfactory degree of cure.

Several amide interpolymers as described above were prepared as follows, for use in formulating compositions exemplifying the invention:

PREPARATION OF AMIDE INTERPOLYMER A

In accordance with this example, an interpolymer was prepared from:

| | Parts by weight |
|---|---|
| Acrylamide | 10 |
| Ethyl acrylate | 65 |
| Styrene | 25 |
| n-Butanol | 50 |
| Solvesso 150 (aromatic hydrocarbon solvent—B.P. range 185°–200° C.) | 50 |

The above solution was refluxed at a temperature ranging from about 225° F. to 237° F. for 2 hours in the presence of 1 part cumene hydroperoxide, 0.5 part more cumene hydroperoxide was then added after each of three successive reflux intervals for 2 hours. After the fourth 2-hour interval, 0.5 part cumene hydroperoxide, 21 parts of a 40 percent solution of formaldehyde in butanol (butyl Formcel) and 0.3 part maleic anhydride were added to the mixture, which was azeotropically distilled for 3 hours to remove the formed water. The mixture was then cooled to 175° F., diatomaceous earth was added and the product was filtered at 175° F. The resulting resinous composition had a solids content of about 50 percent and a viscosity (Gardner-Holdt) ranging from Y to Z.

PREPARATION OF AMIDE INTERPOLYMER B

An interpolymerizable mixture was prepared comprising:

| | Parts by weight |
|---|---|
| Acrylamide | 90 |
| Methacrylic acid | 15 |
| Ethyl acrylate | 264 |
| Styrene | 231 |
| n-Butanol | 300 |
| Toluene | 300 |

This mixture was refluxed for 2 hours at a temperature between 210° F. and 215° F. in the presence of 9 parts tertiary dodecyl mercaptain and 9 parts cumene hydroperoxide, 3 more parts of cumene hydroperoxide were then added and the mixture was refluxed at the same temperature for another 2 hours, after which were added 3 more parts of cumene hydroperoxide, 190.5 parts of a 40 percent solution of formaldehyde in butanol (butyl Formcel), and 2.6 parts maleic anhydride. This mixture was then distilled azeotropically for 2 more hours to remove water, after which was added 3 more parts cumene hydroperoxide. The mixture was distilled azeotropically for another 2 hours and 3 more parts of cumene hydroperoxide were added, and a final azeotropic distillation was made to a viscosity (Gardner-Holdt) of V–T. The resultant mixture was then filtered at 175° F. and the solids content was 50 percent and the viscosity (Gardner-Holdt) U to W.

PREPARATION OF AMIDE INTERPOLYMER C

Another resin was prepared in the same manner as the resin prepared in amide interpolymer A. The resinous mixture was then cooled to 125° F. and combined with 31.1 parts of a 75 percent toluene solution of an epoxy resin (epoxide equivalent 425–525, M.P. 64–76° C., viscosity C-G, 40 percent solution in butyl Carbitol) and 15.6 parts Solvesso 150 (aromatic solvent, B.P. range 185–200° C.). The resulting resin had a solids content of about 50 percent and a viscosity (Gardner-Holdt) of W–Y.

PREPARATION OF AMIDE INTERPOLYMER D

The following were charged into a reaction vessel:

| | Parts by weight |
|---|---|
| Acrylamide | 30.0 |
| Methacrylic acid | 7.5 |
| Styrene | 130.5 |
| Ethyl acrylate | 132.0 |
| Cumene hydroperoxide | 3.0 |
| Tertiary dodecyl mercaptan | 3.75 |
| Butanol | 75.0 |
| Xylene | 75.0 |

This mixture was refluxed for 2 hours and 1.5 parts of cumene hydroperoxide were added. After refluxing for another 2 hours, there were added 63.6 parts of a 40 percent solution of formaldehyde in butanol, 0.8 part of maleic anhydride, 1.5 parts of cumene hydroperoxide, and 50 parts of toluene. This mixture was azeotropically distilled for 2 hours to remove the water of reaction, 1.5 parts of cumene hydroperoxide were added, the mixture was refluxed for 2 hours and then an additional 1.5 parts of cumene hydroperoxide were added. After refluxing for 2 more hours, the resulting solution was cooled and 100 parts of toluene were added, whereupon the resulting composition had a solids content of about 50 percent and a Gardner-Holdt viscosity of U to W.

The foregoing amide interpolymers were blended with the color-producing substance and solvents, as set forth in the following examples. All parts and percentages are by weight unless otherwise specified.

Example 1

| | Parts by weight |
|---|---|
| Amide interpolymer A | 31 |
| Vinsol ester gum | 4 |
| Solvent (mixture for roll-coating applications given below) | 65 |

The solvent mixture for roll-coating application of the composition consisted of the following:

| | Parts by weight |
|---|---|
| Xylol | 25 |
| Butanol | 25 |

Example 2

| | |
|---|---|
| Amide interpolymer C | 28 |
| Vinsol ester gum | 5 |
| Solvent (same as Example 1) | 67 |

Example 3

| | |
|---|---|
| Amide interpolymer D | 100.0 |
| Petroleum hydrocarbon-insoluble pine wood resin (Vinsol) | 5.6 |
| Toluene | 89.0 |
| High boiling hydrocarbon solvent—B.P. 175–205° C. (Shell TS–28) | 25 |
| High boiling hydrocarbon solvent—B.P. 160–205° C. (Enjay 150) | 25 |

These coating compositions were applied by roll-coating on sheet metal at a coating weight of 5 to 7 milligrams per square inch when used as a single coating, and 3 to 5 milligrams per square inch when used as a base coat. The coated metal was then baked for about 8 to 10 minutes at an oven temperature of about 300 to 400° F. In one series, a vinyl coating composition comprising a copolymer containing 85 percent vinyl chloride and 15 percent vinyl acetate was applied over the interpolymer base coat in a coating thickness of 3 to 5 milligrams per square inch. These coatings were then subjected to standard tests as follows:

*Adhesion.*—The baked coating is first scored with a knife edge and the score is then covered with Scotch tape which is removed. The area proximate to the score is then examined to determine the amount of coating material which is removed with Scotch tape. The amount of coating material which comes off with the Scotch tape is indicative of the adhesion.

*Side seam scorch.*—This test comprises dipping the coated substrate into a solder bath having a temperature of 650 to 700° F. for 3–5 seconds. The degree of darkening is used as a measure of decomposition of the coating material.

*Can end fabrication.*—No. 303 can ends are die-stamped with base coat and base coat plus top coat, and then subjected to acidic copper sulfate for 5 minutes. If the fabricating has cracked the coating, there will be an electrolytic exchange of the metal of the can for the copper combined as copper sulfate; the free copper is the plate on the cracked areas. The amount of deposited copper is used as a measure of cracking, which in turn is an indication of flexibility and ability to withstand fabrication.

*Flavor test.*—This test is carried out by pasteurizing the coated substrates in distilled water and beer which is then tasted by at least ten individuals. Distilled water and beer are used as a standard to determine any changes in flavor which may be imparted by the subject coating.

*Blush resistance.*—This test is carried out by placing the coated substrates in water having a temperature of 150° F. for 90 minutes. The "blush" of the coating is measured by the degree of whitening which occurs in the coating.

The results of these tests are set forth in Table I, along with the results attained with a conventional varnish for interior base liners; the varnish employed consisted essentially of a maleic anhydride-polyester resin, chinawood oil and linseed oil, along with iron linoleate and manganese naphthenate present as oxides.

TABLE I

| Coating | Adhesion to Metal | Side Seam Scorch | Can End Fabrication | Adhesion of Vinyl Top Coat to Base Coat | Flavor Test | Blush Resistance |
|---|---|---|---|---|---|---|
| Varnish | Good | Poor | Good | | Poor | Excellent. |
| Example 1 | Excellent | Good | do | | Good | Do. |
| Example 2 | do | do | Fair | | Excellent | Do. |
| Example 3 | do | do | Good | | do | Do. |
| Vinyl (only) | Poor | Poor | Excellent | Poor | do | Poor. |
| Varnish under vinyl | Good | | do | Good | Good | Good. |
| Example 1 under vinyl | Excellent | | do | do | do | Do |
| Example 2 under vinyl | do | | do | do | do | Do. |
| Example 3 under vinyl | do | Good | do | do | do | Do. |

In addition to the epoxy resins as described above, numerous other resins may be blended with the amide interpolymer and the ester gums or pine wood resin. For instance, there may be employed blends of amide interpolymers with butylated formaldehyde condensation products of butenylphenol (these products are prepared in U.S. 2,907,751), vinyl halide resins, butadiene-styrene copolymers, or polyamides, e.g. condensation products of an unsaturated fatty acid and a dialiphatic amine with molecular weights ranging from 3,000 to 10,000.

One particular composition having excellent adhesion and taste properties, which in many instances may be used as a single coat beverage liner, is made from 47.2 parts of amide interpolymer C and 47.2 parts polyvinyl chloride (VMCH) with 5.6 parts Vinsol ester gum.

Obviously, a great many other aldehyde-modified acrylamide interpolymers may be utilized in place of those specified in the examples. Similarly, other resins selected from those disclosed hereinabove may be substituted for the resins which were blended in the examples. Modifications in the solvent systems may also be made.

According to the provisions of the patent statutes there are described above the invention and what are now considered to be its best embodiments. However, it is to be understood that, within the scope of the appended claims, the invention may be practiced otherwise than as specifically described.

I claim:
1. A coating composition comprising (a) from about 98 percent to about 60 percent by weight of a resinous composition comprising a monoaldehyde-substituted interpolymer of an ethylenically unsaturated carboxylic acid amide and at least one other polymerizable ethylenically unsaturated monomer, and (b) from about 2 percent to about 40 percent by weight of a member of the class consisting of ester gum and substantially petroleum hydrocarbon-insoluble pine wood resin.

2. A coating composition comprising (a) from about 98 percent to about 60 percent by weight of an interpolymer of an ethylenically unsaturated carboxylic acid amide and at least one other polymerizable ethylenically unsaturated monomer, said interpolymer being characterized by containing amide groups having a hydrogen atom replaced by the structure

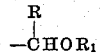

where R is selected from the group consisting of hydrogen and alkyl radicals and $R_1$ is selected from the group consisting of hydrogen and organic radicals derived by removing the hydroxy group from a monohydric alcohol of up to about 20 carbon atoms and (b) from about 2 percent to about 40 percent by weight of substantially petroleum hydrocarbon-insoluble pine wood resin.

3. The composition of claim 2 in which said interpolymer comprises from about 2 to about 50 percent by weight of acrylamide.

4. A coating composition comprising (a) from about 98 percent to about 60 percent by weight of an interpolymer of an ethylenically unsaturable carboxylic acid amide and at least one other polymerizable ethylenically unsaturated monomer, said interpolymer being characterized by containing amide groups having a hydrogen atom replaced by the structure

where R is selected from the group consisting of hydrogen and alkyl radicals and $R_1$ is selected from the group consisting of hydrogen and organic radicals derived by removing the hydroxyl group from a monohydric alcohol of up to about 20 carbon atoms, and (b) from about 2 to 40 percent by weight of ester gum.

5. The composition of claim 4 in which said interpolymer comprises from about 2 to about 50 percent by weight of acrylamide.

6. The composition of claim 4 in which said ester gum is the glycerol ester of substantially petroleum hydrocarbon-insoluble pine wood resin.

7. A coating composition comprising (a) from about 98 to about 60 percent by weight of a mixture of a polyglycidyl ether of a polyhydric compound and a monoaldehyde-substituted interpolymer of an ethylenically unsaturated carboxylic acid amide and at least one other polymerizable ethylenically unsaturated monomer, and (b) from about 2 to about 40 percent by weight of a member of the class consisting of ester gum and substantially petroleum hydrocarbon-insoluble pine wood resin.

8. The composition of claim 7 in which said member is the glycerol ester of substantially petroleum hydrocarbon-insoluble pine wood resin.

9. The composition of claim 7 in which said epoxy resin in a polyglycidyl ether of a diphenol, having a molecular weight of about 200 to about 1000.

10. A metallic container having thereon a layer of a cured film of the coating composition of claim 2.

References Cited by the Examiner

UNITED STATES PATENTS

| | | | |
|---|---|---|---|
| 1,779,710 | 10/1930 | Norman | 260—104 |
| 2,066,759 | 1/1937 | Bent | 134—26 |
| 2,376,504 | 5/1945 | Pfann et al. | 260—104 |
| 2,572,086 | 10/1951 | Wittcoff et al. | 260—104 |
| 2,870,117 | 1/1959 | Vogel et al. | 260—72 |
| 3,079,434 | 2/1963 | Christenson et al. | 260—80.5 |
| 3,117,693 | 1/1964 | Vogel | 117—75 |

LEON J. BERCOVITZ, *Primary Examiner.*

DONALD E. CZAJA, *Examiner.*

UNITED STATES PATENT OFFICE
CERTIFICATE OF CORRECTION

Patent No. 3,251,793                                                             May 17, 1966

Henry A. Vogel

It is hereby certified that error appears in the above numbered patent requiring correction and that the said Letters Patent should read as corrected below.

Column 10, line 5, for "unsaturable" read -- unsaturated --; line 18, for "to 40 per cent" read -- to about 40 per cent --.

Signed and sealed this 26th day of September 1967.

(SEAL)
Attest:

ERNEST W. SWIDER                                             EDWARD J. BRENNER
Attesting Officer                                                 Commissioner of Patents